United States Patent [19]
Haeggstrom

[11] Patent Number: 6,167,040
[45] Date of Patent: Dec. 26, 2000

[54] SPEECH TRANSMISSION BETWEEN TERMINALS IN DIFFERENT NETWORKS

[75] Inventor: Johan Haeggstrom, Espoo, Finland

[73] Assignee: Nokia Telecommunications Oy, Espoo, Finland

[21] Appl. No.: 09/327,670

[22] Filed: Jun. 8, 1999

Related U.S. Application Data

[63] Continuation of application No. PCT/FI98/00789, Oct. 9, 1998.

[30] Foreign Application Priority Data

Oct. 10, 1997 [FI] Finland .................................... 973933

[51] Int. Cl.$^7$ .................................................. H04L 12/56
[52] U.S. Cl. ............................................ 370/352; 370/356
[58] Field of Search ..................................... 370/352–356

[56] References Cited

U.S. PATENT DOCUMENTS 5,903,833  5/1999  Jonsson et al. ......................... 455/417

FOREIGN PATENT DOCUMENTS

| | | |
|---|---|---|
| 0738060 | 10/1996 | European Pat. Off. . |
| WO 9728628 | 8/1997 | WIPO . |
| WO 9729581 | 8/1997 | WIPO . |

OTHER PUBLICATIONS

Simeonov, P.L. et al., '@INGate: A Distributed Intelligent Network Approach to Bridge Switching and Packet Networks', IEEE, pp. 358–363, 1997.

"Performance Evaluation of a Wideband Testbed Based on CDMA," IEEE Vehicular Technology Conference, vol. 2, May 1997, pp. 1009–1013.

*Primary Examiner*—Melvin Marcelo
*Attorney, Agent, or Firm*—Altera Law Group, LLC

[57] ABSTRACT

The invention concerns a system, which allows speech transmission between a mobile station and terminal equipment connected to a data network. The terminal equipment, preferably an Internet telephone, sends and receives data packets in accordance with the protocol of the data network in question and is provided with telephone characteristics. It has a speech coder in accordance with the mobile station system which synthesises the original speech from the speech parameters sent by the mobile station and contained in the data packets arriving from the data network and which correspondingly produces speech parameters for location in outgoing data packets. The speech parameters are conveyedas such between the mobile station and the terminal equipment without applying any additional coding to them. When the mobile telephone network is a packet switched network, it may be connected directly to the data network or, when the mobile telephone network is a circuit switched network, a gateway is used, which performs any necessary conversions, so that the call can be connected from one network to the other.

10 Claims, 4 Drawing Sheets

SPEECH TRANSMISSION BETWEEN TERMINALS IN DIFFERENT NETWORKS

This application is continuation of PCT/F198/00789 filed Oct. 9, 1998.

FIELD OF THE INVENTION

This invention concerns speech transmission between two pieces of terminal equipment, one of which is terminal equipment in a mobile telephone network, while the other is terminal equipment having access to the Internet.

TECHNICAL BACKGROUND

In a digital telephone system, digital speech signal is processed in speech coding e.g. by frames of about 20 ms and using various methods, so that the result is a set of speech-depicting parameters per each frame. This information or the set of parameters is channel coded and sent to the transmission path.

FIG. 1 is a simplified view of a GSM network from the viewpoint of transmission. A Network Subsystem NSS includes a Mobile Switching Centre 15 MSC, through the system interface of which the mobile telephone network is connected to other networks, such as a Public Switched Telephone Network PSTN. The Network Interworking Functions 16 IWF are designed to adapt the GSM network to these other networks. The network subsystem NSS is joined through an A interface with a Base Station Subsystem BSS, which includes Base Station Controllers BSC 14, each of which controls the Base Transceiver Stations BTS 13 connected to them. The interface between the base station controller and the base transceiver stations connected to it is an A bis interface. The base transceiver stations again are in radio communication with the mobile stations through a radio interface.

Speech coding is done on both sides of the radio interface, that is, in the mobile station and in the network. The speech encoder located on the network side is called a transcoder and it is a part of a Transcoder and Rate Adaptation Unit TRAU. This unit is part of a base station subsystem BSS and it may be located in connection with the base station controller 14 as in FIG. 1 or in connection with the mobile services switching centre. The transcoders convert the speech from digital format into some other format, e.g. they convert 64 kbit/s A-law PCM coming over the A interface from the centre into 13 kbit/s Full Rate FR coded speech for conveyance to the base station line and vice versa. If the transmission is data transmission, they also perform rate adaptation.

On the network side, the transcoder unit must obtain information from the radio interface for efficient decoding. For this purpose a special inband signaling is used on that same channel between the base transceiver station and the transcoder unit, on which speech or data is transmitted.

The FR speech coder input is either a 13 bit PCM signal arriving from the network side or A/D converted 13 bit PCM arriving from the audio part of the mobile station. The speech frame, a so-called TRAU frame, obtained from the coder output, has a duration of 20 ms and it includes 260 bits, which are formed by coding 160 PCM-coded speech samples. In addition, the TRAU frame has 60 bits available for frame synchronisation, for indication of speech and data, for timing and for other information, so that the total length of the TRAU frame is 320 bits. The frame produced by the Half Rate HF speech coder includes 112 bits, which is equal to a bit flow of 5,6 kbit/s. The frame produced by an Enhanced Full Rate EFR includes 244 bits, which is equal to a bit flow of 12,2 kbit/s.

FIG. 1 shows the transmission rates per channel which are used in the GSM. The mobile station sends speech or data information over the radio interface on a radio channel as traffic frames. Base transceiver station 13 receives the information and transmits it to the TRAU frame into the subtime slot of the PCM line. The full rate connection uses a 16 kbit/s TRAU frame while the half rate connection uses an 8 kbit/s TRAU frame. In the same 64 kbit/s time slot of the PCM line, 4 or 8 traffic channels are obtained in this way. In base station controller 14 the transcoder/rate adaptation unit TRAU converts the digital information contained in the TRAU frame to a rate of 64 kbit/s, and the data is transmitted at this rate to the mobile services switching centre, whereupon following modulation and a rate change, if such are required, the information is transmitted to some other network.

In the arrangement described above, a double speech coding in a call between two mobile stations takes place in the network: the speech coming from the first mobile station which is transmitted in TRAU frames and coded in the mobile station's speech coder is decoded in the TRAU unit, whereupon the speech propagates as PCM speech to the mobile services switching centre and thence further e.g. to a TRAU unit which is located in another location area of the same centre area and which codes the speech into TRAU frames. This double coding is called tandem coding. If the mobile stations use the same speech codec, any tandem coding between them is unnecessary as such and will only result in a poorer quality of speech. Various methods of preventing tandem coding have therefore been proposed. It is a common feature of most of these that tandem coding is prevented by sending the coded speech parameters in the PCM time slot on a sub-channel formed by one or several less significant bits while the remaining bits are used for sending the most significant bits of the PCM samples. If the TRAU unit at the other end perceives that there are TRAU frames on the sub-channel, it will not perform coding on them, but it will transmit them further as such, so the parameters will be decoded to speech only in the mobile station. If the transcoder is unable to identify the subchannel, it will code the PCM samples in a normal manner into speech parameters. The methods differ from each other mainly in how the transcoders know not to encode samples transmitted on the sub-channel. The information can be relayed in hand shaking between the transcoders, by monitoring the sub-channel's signalling pattern or by having the mobile services switching centre inform the transcoders about the matter.

Current mobile telephone networks allow speech transmission between two parties, each of which may be a subscriber of a mobile telephone network as the call travels inside the same mobile telephone network or by way of a circuit switched PSTN/ISDN network from one mobile telephone network to another. The other subscriber may also be a subscriber of a circuit switched PSTN/ISDN network. In all cases, the connection is always circuit switched and it is reserved for use by these two parties during the whole transmission of information.

Originally, the mobile telephone network was designed for efficient speech transmission, and in present day networks data transmission rates are in fact rather low. This situation is improved by the General Packet Radio Service GPRS system which uses virtual circuits and is intended for transmission of packet data and which is being specified by the ETSI (European Telecommunications Standards Institute). The purpose of GPRS services is to operate independently of current circuit switched services, and especially to utilize the unused resources of circuit switched traffic.

Based on the foregoing it is possible to perceive the matter which is a characteristic of current mobile telephone networks, that speech calls going out from a mobile services switching centre always travel to a public switched telephone network PSTN.

Lately, use of the Internet for speech transmission has become increasingly popular. In telephone traffic transmitting speech in packet form over a data network the terminal equipment used is e.g. a computer which is equipped with multimedia properties and is connected to a telecommunication network. The connection with another party is set up by way of the Internet network. Call management operations, such as call set up and release, are performed with the aid of software in the computer. The call is controlled by a CTI programme (CTI=Computer Telephony Integration), which reads the speech going out from the audio card and converts it into a form suitable for conveyance in a telecommunication network. The programme reads the incoming speech from a signal received from the telecommunication network and controls the audio card to repeat the speech from loudspeakers. The programme also maintains information on the state of the call, such as whether the terminal equipment is in a passive (on-hook) or in an active (off-hook) call state, whether the call is going on, whether a call is coming in, whether dialling is being done, etc. and through the telecommunication network it forms a connection with the other participant or participants to the call. An advantage of the call is its cheap price, but it suffers especially from the poor call quality caused by transmission delays in particular.

The separateness of networks is a problem with calls of the Internet and the mobile telephone network. By using the speech service of a mobile station network, the mobile station subscriber can not get in speech connection with a piece of terminal equipment connected to the Internet packet network, nor can the terminal equipment have a connection with the mobile station.

The present invention aims at a system, which allows the described speech calls to a data network, especially between a telephone connected to the Internet and a mobile station.

The proposed system is characterised in that which is stated in the independent claims.

SUMMARY OF THE INVENTION

In an arrangement according to the invention, the telephone connected to a data network has a speech codec which is similar to the one in the mobile station. The data network may be an Internet network, whereby the telephone may be a general-purpose computer provided with telephone characteristics. Besides the coding of speech taking place in the terminal equipment, no additional codings are performed between the telephones, so the speech parameters are transmitted as such over the connection from one terminal equipment to the other terminal equipment. Thus, from the viewpoint of speech coding, the operation is tandem free.

Compared with a call between two mobile telephones, the speech quality is advantageous in an Internet call, because no successive speech coding takes place. In some Internet telephones the GSM full rate speech codec is even now used as de facto standard. They produce 20 ms speech packets which are well suited for the data transmission in packet form which takes place in the Internet network. The speech codecs of the mobile telephone system also contain functions improving the transmission error tolerance. Transmission errors, and transmission delays in particular, have a harmful effect on the speech quality of current Internet telephones.

Two embodiments are described in the invention for connecting calls directly between a mobile telephone network and a data network. The first embodiment is based on the GPRS (General Packet Radio Service) transmission standard for incoming packet data and the speech frames are there located directly into the data network's packets, e.g. into IP frames. In the second embodiment, the tandem free call is connected to the data network through a gateway which is connected to the mobile services switching centre and which locates the speech packets into frames, e.g. into IP frames. Both methods make it possible for the mobile telephone operator to provide calls between the telephone in the data network and the mobile station without using any public switched telephone network.

BRIEF DESCRIPTION OF THE DRAWINGS

The invention is described in the following with reference to the appended schematic drawings, wherein.

DETAILED DESCRIPTION OF THE INVENTION

The first embodiment of the invention is based on utilisation of the GPRS (General Packet Radio Service) system which is known as such. The system uses connection practices of the Internet in part, and the GPRS network can indeed be connected directly to the Internet. Since it is possible for the user to define the minimum transmission band he needs and since the transmission of coded speech requires a certain band, the GPRS is suitable as such for application of the invention.

Figure 1:
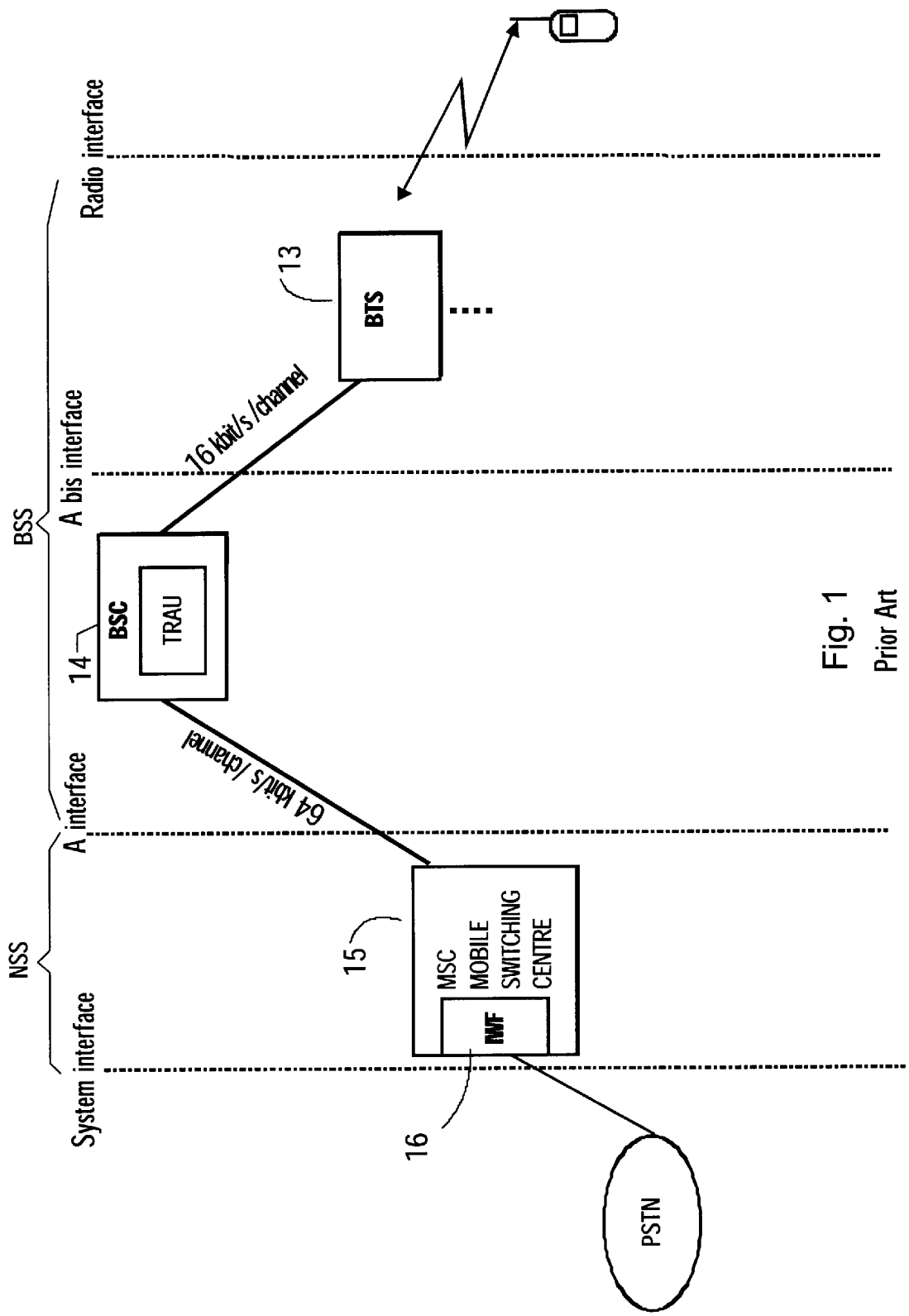
FIG. 1 shows speech transmission in a mobile telephone system.
Figure 2:
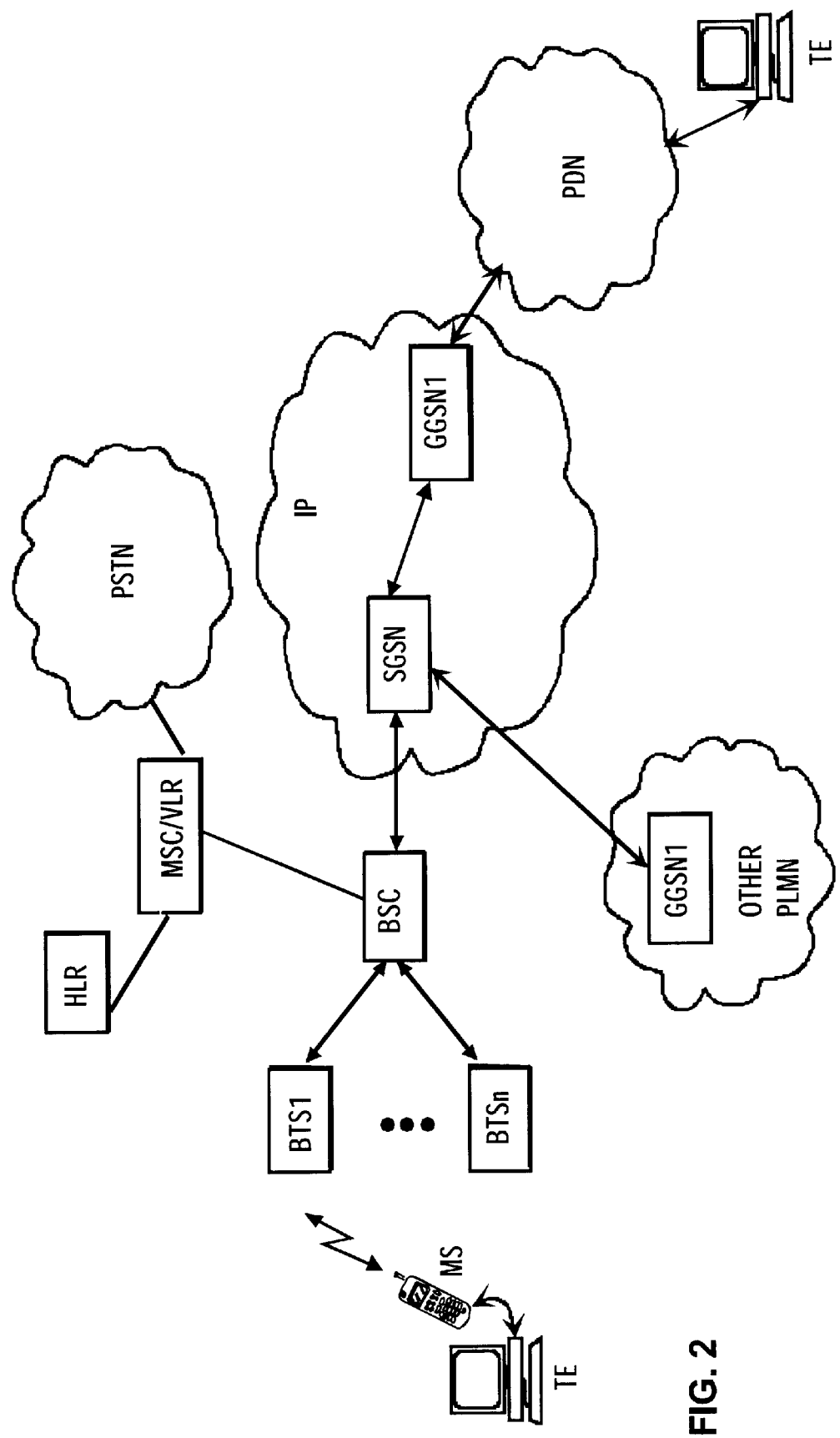
FIG. 2 shows the proposed mobile telephone system for transmission of packet data.

FIG. 2 shows the logical architecture of the GPRS system. The system is implemented logically on top of the GMS system by adding two new network elements. These are the serving GPRS node (SGSN, Serving GPRS Support Node) and the GPRS gateway node (GGSN, Gateway GPRS Support Node). The mobile station may be a dual purpose station, so that it may work as a normal GSM telephone and as a GPRS telephone relaying packet data. A base transceiver station system BSS is operated from the mobile telephone system and it includes a base station controller BSC and several base transceiver stations BTS1, . . . , BTSn. The nodes in the network are in connection with each other by way of a packet network, e.g. an IP network (IP=Internet Protocol). The network is connected to other PLMN (Public Land Mobile Network) networks so that the serving GPRS node is in connection with a GPRS gateway node (GGSN) which is located in another network. The GPRS network transmits packet data to some PDN (Packet Data Network) and receives packet data therefrom through the GPRS gateway node (GGSN1). In the gateway node an address conversion is performed between the address used in the packet network and the address (IP address) used in the GPRS network and it contains the routing information of GPRS users, which is used to bring about a connection from the terminal equipment TE of the packet network to that serving GPRS node, under the management of which the MS is located. The serving node contains the function for management of the movement of mobile stations as well as safety functions. Both the gateway and the serving node contain IP routing functionalities.

The GPRS network can use services of the PLMN network's mobile services switching centre MSC and of the subscriber databases of the home location register HLR and of the visitor location register VLR.

Figure 3:
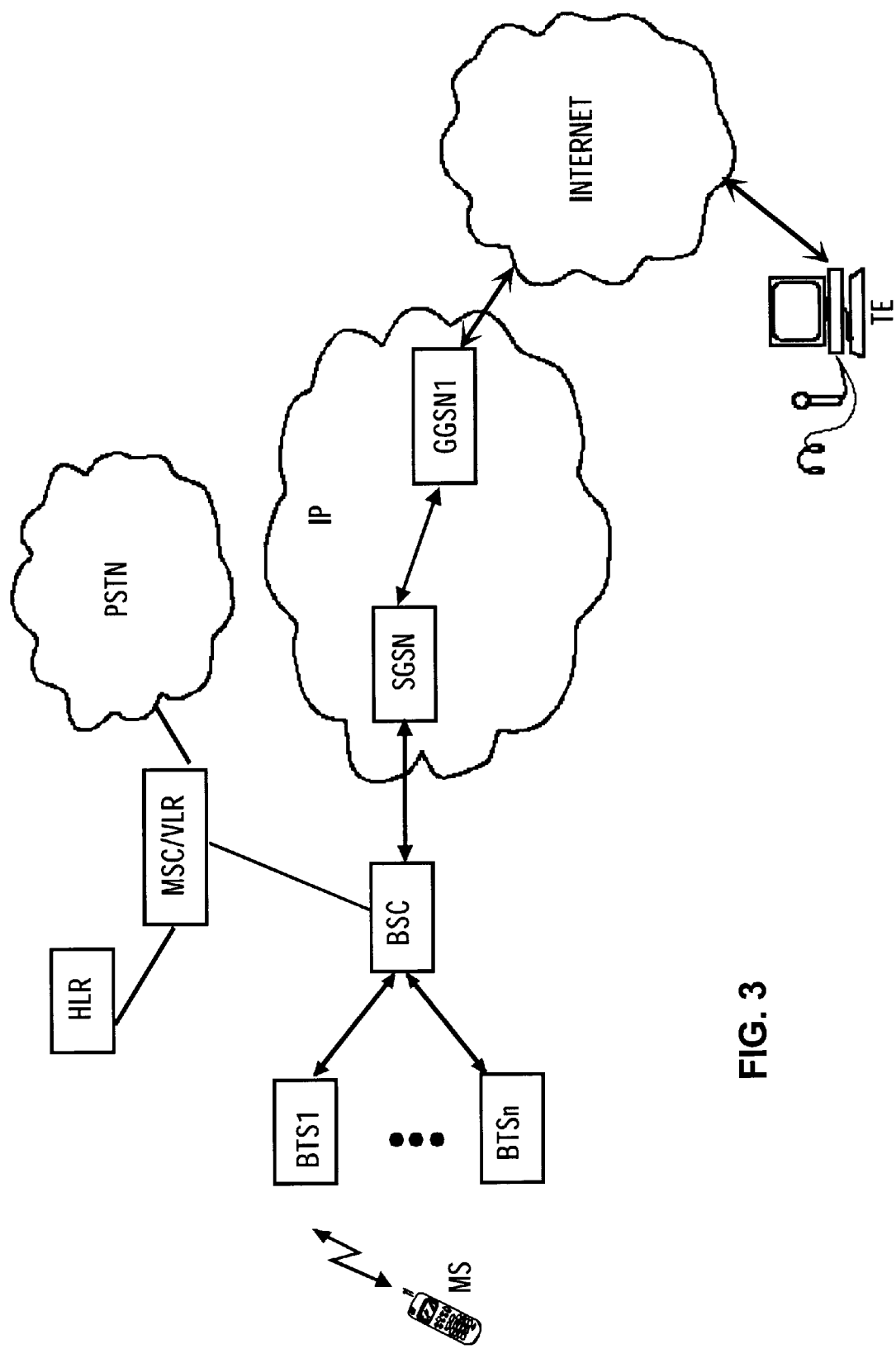
FIG. 3 illustrates a first embodiment of the invention.

FIG. 3 shows an arrangement in accordance with the first embodiment. The figure is different from FIG. 2 only in that the computer in connection with the Internet is equipped with a telephone. Normally, speech sent by a mobile telephone is routed to the mobile services switching centre MSC/VLR, either coded into PCM speech in a TRAU unit or in the case of a tandem free operation also as speech parameters. To route the speech frames into the GPRS network, such a property must be added to a state-of-the-art mobile station, which makes sure that speech frames will be routed to the packet switched GPRS network and not to the circuit switched GSM network.

A call starting from a mobile station takes place e.g. so that the mobile station subscriber enters on his telephone's keys the Internet address of the terminal equipment TE connected to the Internet network, whereby the call goes to the gateway node GGSN1, which calls the terminal equipment. When the terminal equipment has answered the call, the pieces of terminal equipment agree on the speech codec and on other call parameters, whereupon the users may begin speaking. The mobile station MS, which may be a GSM telephone, codes the speech frame into parameters. The parameters are located in a PDU (Protocol Data Unit) packet according to the GPRS system, which packet is transmitted like data packets of a normal data transmission through base transceiver station BTS1 and base station controller BSC to the serving SGSN node. The received packets are located in buffers, from which the PDU packets are taken out in succession and the speech parameters in the packets are decoded. The speech parameters are then located in UDP (User Datagram Protocol)/IP packets. Parameters of tens of speech frames may be located in one UDP/IP packet, but it is most advantageous to locate only a few frames in each packet, e.g. the parameters of 3–5 frames, to keep the transmission delay as short as possible.

To make sure that the frames will arrive in the correct order at the terminal equipment, the frames are numbered with running numbers. This may be done e.g. by using the RTP (Real-Time Protocol) control of the Internet.

When a UDP/IP packet has been formed in the gateway node GGSN1, it is transmitted to the Internet network, from which it will end up in the terminal equipment according to its address. The equipment discharges the packet, separates the speech parameters therefrom and conducts them to the speech coder. The terminal equipment TE has a similar speech codec as the mobile station, so the codec decodes the parametrised speech into the original speech, which is repeated through a loudspeaker or earphones.

In a similar manner, the speech codec parametrises speech frames in the terminal equipment. The application programme locates the numbered speech frames in UDP/IP packets and places in each packet the IP address of the receiving mobile station MS. The packets arrive at the gateway node GGSN1, which routes the packets further to the mobile station MS, where the station's speech codec decodes the parameters into speech.

The method in accordance with the first embodiment uses a discontinuous transmission, so the average transmission rate would be approximately one-half of the rate of the standard bit flow produced by the speech codecs. To make efficient use of the discontinuous transmission, the pieces of terminal equipment ought to use an efficient remover of acoustic echo.

Figure 4:
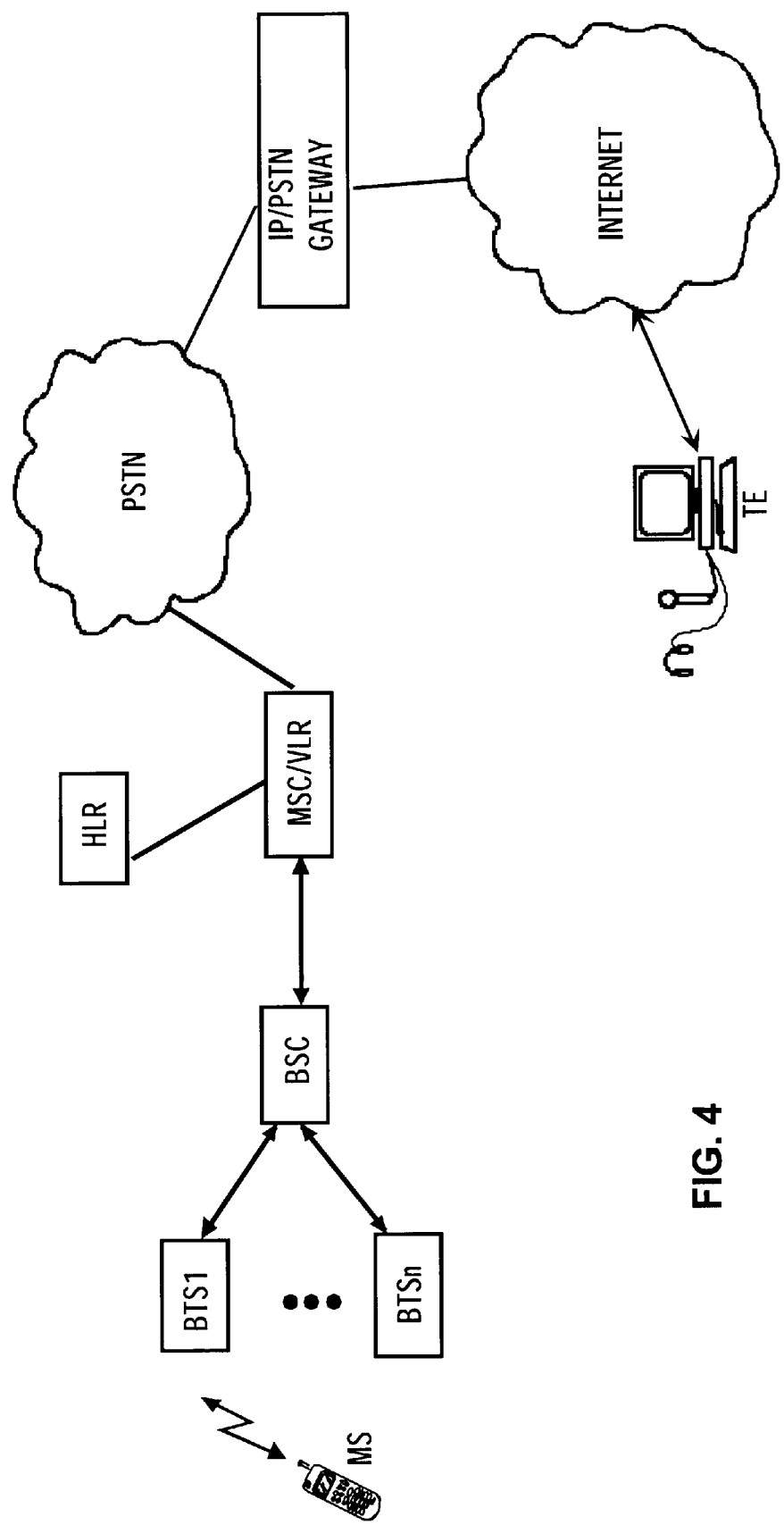
FIG. 4 illustrates a second embodiment of the invention.

FIG. 4 shows a method in accordance with the second embodiment. Its idea is by using the TFO (Tandem Free Operation) function to transmit speech bits encoded by the GSM telephone by way of the PSTN access of the mobile services switching centre to the IP/PSTN gateway 41 and thence further to the Internet network. At the receiving end the Internet telephone decodes the speech bits and, correspondingly, in the other direction of transmission it sends encoded speech bits towards gateway 41, from which they travel to the mobile services switching centre MSC/VLR and further to the mobile station MS.

In the direction from the mobile station towards the terminal equipment TE, the gateway should discharge the speech parameters of a few TFO frames (TRAU frames) arriving from the mobile services switching centre and locate them in the UDP/IP frame. In addition, the gateway should change the PSTN number of the call into an Internet address and further route the UDP/IP packet according to the address. In the direction from the terminal equipment TE towards the mobile station, it is the duty of the gateway to discharge speech frames from the UDP/IP packets arriving from the terminal equipment and to pack these as TFO frames which are to be sent towards the mobile services switching centre. In addition, the gateway should change the Internet address of arriving UDP/IP packets into GSM numbers. Other duties of the gateway include signalling on the PSTN side and maintenance of the IP interface as well as the in-band signalling required by the TFO function.

A call from a mobile station to an Internet telephone can be implemented in such a way that the mobile station MS first gets in touch with the IP/PSTN gateway by giving its PSTN number. When the gateway has acknowledged the call and a connection has been set up as far as the gateway, the mobile station gives the IP number of the target telephone. When the Internet telephone has acknowledged the call from the gateway, the telephone communication may begin.

Correspondingly, when starting a call from an Internet telephone, a call is sent to the PSTN number of the gateway. When the gateway has answered, the MSISDN number of the mobile station is given, whereby the gateway sends a call to the mobile station by way of the mobile services switching centre. When the mobile station has answered, the telephone communication may begin.

In a method according to the second embodiment, the Internet telephone may also be given the PSTN number which is given by the mobile station subscriber when setting up the call. Correspondingly, the mobile telephone in addition to the MSISDN number also has the Internet address given by the terminal equipment TE when the call is set up. Hereby the gateway may perform a number conversion in both directions or there may be such a software in the terminal equipment which changes the PSTN number automatically into an Internet address.

The physical location of the gateway may be e.g. in connection with the compressors between mobile services switching centres. However, the invention does not limit the location of the gateway, but it may be in any PSTN network, provided that the TFO traffic will pass through unchanged. Discontinuous transmission is used in the method, whereby the average transmission rate would be approximately one-half of the rate of the standard bit flow produced by the speech codecs. In order to utilise the discontinuous transmission efficiently, an efficient remover of acoustic echo should be used in the terminal equipment.

The addition to existing systems required by the invention is an IP/PSTN gateway between the mobile telephone network and the Internet network, which gateway is connected "behind" the PSTN connection of the mobile services switching centre. In addition, the Internet telephone should use at least one speech codec like the one used in the mobile telephone system.

The gateway application may be enlarged so that it is used in speech transmission between the telephone of a packet switched mobile station network, such as a GPRS network, and the telephone of a PSTN network. Hereby the system would be such that there is a connection from the gateway node GGSN through the data network with the gateway, on the other side of which a circuit switched PSTN network opens up. The gateway performs the adaptation between the data network and the PSTN network and, in addition, decoding of the speech used in this mobile station network. Through the gateway a call can be set up from a mobile station to a conventional PSTN telephone by using a packet switched mobile station network.

What is claimed is:

1. System for speech transmission between two pieces of terminal equipment, of which the first terminal equipment is a mobile station which is connected to a mobile telephone network through a radio link and the speech coder of which produces speech frames containing speech parameters, and the second terminal equipment is connected to a fixed network, wherein the fixed network is a data network conveys data packets and the second terminal equipment having telephone characteristics transmits and receives data packets in accordance with the protocol of the network in question, the second terminal equipment has a speech coder in accordance with the mobile station system which synthesizes the original speech from the speech parameters sent by the mobile station contained in the data packets arriving from the data network and produces speech parameters for location in outgoing data packets, the speech parameters are relayed as such between the terminal equipment without doing any further coding on them.

2. System as defined in claim 1, wherein the fixed network is an Internet network and the data packets are packets in accordance with the IP protocol.

3. System as defined in claim 1, wherein the mobile station network is a circuit switched network which is intended for speech transmission and in which speech parameters are also transmitted after decoding performed in a transcoder in speech frames in one or two least significant bits of the PCM samples.

4. System as defined in claim 3, wherein speech frames arriving from the fixed network in one or two least significant bits of PCM samples to the transcoder are transmitted further as such.

5. System as defined in claim 1, wherein between the mobile station network and the fixed network relaying data packets there is a gateway, which locates the speech parameters in the speech frames arriving from the mobile station network into data packets and, correspondingly, it locates the speech parameters in data packets arriving from the fixed network into speech frames of the mobile station network.

6. System as defined in claim 5, wherein the terminal equipment at the beginning of the call first gets in contact with the gateway.

7. System as defined in claim 6, wherein the mobile services switching center is in PCM connection with the gateway by way of a public switched telephone network PSTN.

8. System as defined in claim 6, wherein the gateway performs a number conversion between the number of the first terminal equipment used in the mobile telephone network and the number of the second terminal equipment connected to the fixed network.

9. System as defined in claim 1, wherein the mobile station network is a packet switched General Packet Radio Service (GPRS) network which is known as such and which is intended for data transmission, and that the speech parameters are transmitted in its normal data packets.

10. System as defined in claim 9, wherein the transmission of speech frames between the General Packet Radio Service network and the fixed network is implemented by using the IP network inter-face existing in the General Packet Radio Service network.

* * * * *